(12) United States Patent
Heusel

(10) Patent No.: US 9,207,663 B2
(45) Date of Patent: Dec. 8, 2015

(54) FORMING AND/OR CUTTING PLATE WORKPIECES

(71) Applicant: TRUMPF Werkzeugmaschinen GmbH + Co. KG, Ditzingen (DE)

(72) Inventor: Joerg Heusel, Stuttgart (DE)

(73) Assignee: TRUMPF Werkzeugmaschinen GmbH + Co. KG, Ditztingen (DE)

( * ) Notice: Subject to any disclaimer, the term of this patent is extended or adjusted under 35 U.S.C. 154(b) by 0 days.

(21) Appl. No.: 14/161,937

(22) Filed: Jan. 23, 2014

(65) Prior Publication Data

US 2014/0135973 A1    May 15, 2014

Related U.S. Application Data

(60) Division of application No. 12/425,534, filed on Apr. 17, 2009, now Pat. No. 8,671,728, which is a continuation of application No. PCT/EP2007/008447, filed on Sep. 28, 2007.

(30) Foreign Application Priority Data

Oct. 18, 2006   (DE) .......................... 10 2006 049 045

(51) Int. Cl.
*G05B 19/19*   (2006.01)
*B21D 17/04*   (2006.01)

(52) U.S. Cl.
CPC .............. *G05B 19/195* (2013.01); *B21D 17/04* (2013.01)

(58) Field of Classification Search
CPC ............. B21B 13/16; B21J 15/12; B21J 9/05; B21D 53/00; B21D 17/04; B21D 5/08; B21D 13/04; B21D 5/12; B21D 39/14; B21D 41/02; B21D 41/04; B21D 22/16; B21D 39/10; B21D 39/06; B21D 19/04; B21D 39/20; B21D 5/14; B21D 28/12; B21D 37/04; B21D 37/044; B21D 37/046; B21D 37/048; B21C 37/0822; B21C 37/207; B21C 37/298; B24B 39/023; B23P 23/00–23/04; B23Q 3/155; B23Q 2003/15586; B23Q 39/02; B23Q 39/04; B23B 11/00
USPC ............... 72/67, 75, 112, 115, 122–124, 214, 72/215, 220, 179, 182, 442, 444, 446; 29/560–650
See application file for complete search history.

(56) References Cited

U.S. PATENT DOCUMENTS 5,156,034 A * 10/1992 Lorbach ............... B21D 43/285
                                                              72/10.6
5,555,759 A *  9/1996 Rosene et al. .................. 72/179

(Continued)

FOREIGN PATENT DOCUMENTS

EP       0995510       4/2000
EP       1152842       1/2006
WO       WO9002005     3/1990

OTHER PUBLICATIONS

International Preliminary Report on Patentability from corresponding PCT Application No. PCT/EP2007/008447, issued Apr. 22, 2009, with English translation, issued May 5, 2009, 15 total pages.

*Primary Examiner* — David Bryant
*Assistant Examiner* — Lawrence Averick
(74) *Attorney, Agent, or Firm* — Fish & Richardson P.C.

(57) ABSTRACT

A plate workpiece processing tool includes a first tool portion and a second tool portion. The first and second tool portions are arranged along an application axis in spaced relation to each other such that a plate workpiece can be disposed therebetween. The tool also includes two or more processing devices that are carried by the first tool portion, and one or more counter-devices that are carried by the second tool portion. The processing devices are rotatable, relative to the first tool portion, about a first rotational axis that extends perpendicular to the application axis and are arranged to follow each other along an axis extending perpendicularly to the application axis. The processing devices and the one or more counter-devices are selectively alignable to form a plurality of alternative device pairings for processing plate workpieces therebetween.

21 Claims, 5 Drawing Sheets

(56) References Cited

U.S. PATENT DOCUMENTS

| | | | |
|---|---|---|---|
| 5,655,396 A * | 8/1997 | Siler | 72/75 |
| 6,112,568 A * | 9/2000 | Lindstrom | 72/179 |
| 6,131,430 A * | 10/2000 | Schneider et al. | 72/75 |
| 7,343,767 B2 | 3/2008 | Bauer et al. | |
| 2006/0162413 A1 * | 7/2006 | Bauer et al. | 72/182 |

* cited by examiner

FORMING AND/OR CUTTING PLATE WORKPIECES

CROSS REFERENCE TO RELATED APPLICATIONS

This application is a divisional of and claims the priority of U.S. Ser. No. 12/425,534, filed Apr. 17, 2009, which claims priority under 35 U.S.C. §120 to PCT Application No. PCT/EP2007/008447, filed on Sep. 28, 2007, which claims priority to German Application No. 10 2006 049 045.2, filed Oct. 18, 2006. The contents of all of these priority applications are hereby incorporated by reference in their entirety.

TECHNICAL FIELD

This invention relates to the processing, e.g., the forming and/or cutting, of plate workpieces, such as metal sheets, and tools configured to do such processing.

BACKGROUND

One example of a tool for processing workpieces is known from the publication EP-B-1 152 842. The tool, which is in the form of a rolling tool and which is provided for use on a turret punch press, includes several rotatable processing rollers on an upper tool portion and several rotatable counter-rollers on a lower tool portion. In order to process a workpiece, the tool portions are moved towards each other until the workpiece to be processed is acted upon by the outer surfaces of the processing rollers, which surfaces act as processing devices, and the outer surfaces of the counter-rollers, which surfaces act as counter-devices. The workpiece is then moved relative to the rollers with a workpiece coordinate guide while the rollers continue to act on the metal sheet. Continuous processing of the workpiece takes place with the processing rollers and the counter-rollers rolling along the respective side of the workpiece being acted upon. The processing devices of all of the processing rollers are active during workpiece processing.

SUMMARY

In general, this invention relates to the processing, e.g., the forming and/or cutting, of plate workpieces, such as metal sheets, and tools configured to do such processing.

One aspect of the invention provides a plate workpiece processing tool that includes a first tool portion and a second tool portion. The first and second tool portions are arranged along an application axis in spaced relation to each other such that a plate workpiece can be disposed therebetween. The tool also includes two or more processing devices that are carried by the first tool portion, and one or more counter-devices that are carried by the second tool portion. The processing devices are rotatable, relative to the first tool portion, about a first rotational axis that extends perpendicular to the application axis and are arranged to follow each other along an axis extending perpendicularly to the application axis. The processing devices and the one or more counter-devices are selectively alignable to form a plurality of alternative device pairings for processing plate workpieces therebetween.

In some embodiments, at least two of the two or more processing devices are separately alignable with a common one of the counter devices to form different device pairings.

In certain embodiments, the first tool portion and the second tool portion are rotatable relative to each other about a second rotational axis extending parallel with the application axis.

In some embodiments, the one or more counter-devices and the two or more rotatable processing devices are rotatable relative to each other about the second rotational axis.

In certain embodiments, the rotatable processing devices are arranged to follow each other about the second rotational axis.

In some embodiments, a first one of the processing devices is configured for use in a first machining operation and a second one of the processing devices is configured for use in a second machining operation that is different from the first machining operation.

In certain embodiments, at least two of the rotatable processing devices are provided on a common rotary body which is rotatably mounted to the first tool portion. The common rotary body can have a varying cross-section along its length. In some cases, the varying cross-section defines the rotatable processing devices.

In some embodiments, the common rotary body is in the form of a roller.

In certain embodiments, at least one of the one or more counter-devices is rotatable relative to the second tool portion.

In some embodiments, at least one of the one or more counter-devices is a universally rotatable ball.

In certain embodiments, at least one of the counter-devices is displaceable, relative to at least one other one of the counter-devices, into an operating position in which it projects towards the first tool portion.

In some embodiments, the processing devices are linearly displaceable, relative to the first tool portion, along the first rotational axis.

Another aspect of the invention features a method of processing a plate workpiece. The method includes placing a metal sheet between a first tool portion that carries a roller comprising first and second processing devices and a second tool portion that carries one or more counter-devices; aligning one of the first and second processing devices with one of the one or more counter-devices to form a first device pairing; utilizing the first device pairing to perform a first machining operation on the metal sheet; then, aligning the other one of the first and second processing devices with one of the one or more counter-devices to form a second device pairing, different from the first device pairing; and then utilizing the second device pairing to perform a second machining operation, different from the first machining operation, on the metal sheet.

In certain embodiments, utilizing the first device pairing to perform a first machining operation on the metal sheet includes moving at least one of the first and second tool portions, along an application axis, relative to the other one of the first and second tool portions until the metal sheet is acted upon by the first device paring.

In some embodiments, aligning one of the first and second processing devices with one of the one or more counter-devices to form the first device pairing includes rotating at least one of the first tool portion and the second tool portion relative to the other one of the first tool portion and the second tool portion.

In certain embodiments, at least one of the first machining operation and the second machining operation includes cutting the metal sheet.

In some embodiments, at least one of the first machining operation and the second machining operation includes forming a bead or a step in the metal sheet.

In certain embodiments, the first machining operation includes forming a first step in the metal sheet and the second machining operation includes forming a second step in the metal sheet, the second step having a different height than the first step.

Another aspect of the invention provides a plate workpiece processing tool that includes a first tool portion and a second tool portion. The tool also includes a roller rotatably mounted to the first tool portion and including two or more processing devices, and one or more counter-devices carried by the second tool portion. The processing devices and the one or more counter-devices are selectively alignable to form a plurality of alternative device pairings for processing plate workpieces.

In some embodiments, the roller has a varying cross-section along its length. The varying cross-section defines the two or more processing devices.

In certain embodiments, at least two of the two or more processing devices are separately alignable with one of the one or more counter devices to form different device pairings.

In some embodiments, the roller includes a common rotary body that defines the two or more processing devices.

In another aspect of the invention, different device pairings, which include different rotatable processing devices, are activatable for workpiece processing. Thus, during workpiece processing with one of the rotatable processing devices, influences of a second rotatable processing device can be avoided. The individual rotatable processing devices can therefore be configured with a high degree of freedom. This in turn may broaden the possible uses of the tool.

In some embodiments, the activation of different device pairings with different rotatable processing devices is effected by associating a single counter-device with different processing devices. Consequently, one counter-device can be used together with different rotatable processing devices for workpiece processing. A specific number of activatable device pairings can be made available with a small number of counter-devices. This in turn means that the tool can be manufactured inexpensively.

In certain embodiments, the association of one counter-device with various rotatable processing devices is effected by a relative rotational movement of the counter-device and the processing devices about a rotational axis of the tool. In this regard, the tool can be configured for use on machine tools which normally have rotary drives by means of which the tool portions are rotatable in a controlled manner about rotational axes of the tool. Accordingly, the tool can advantageously use machine axes which are present in order to activate different device pairings.

In some embodiments, either a bead or a step, as desired, can be produced on a workpiece using the same tool.

In certain embodiments, at least two rotatable processing devices are provided on a common rotary body which is rotatable on the first tool portion. Since each rotary body is supported on the tool portion by at least one pivot bearing, locating multiple processing devices on a single rotary body can allow for the number of pivot bearings to be reduced. The structural space gained on the first tool portion by dispensing with pivot bearings can make it possible, inter alia, to configure the pivot bearings of the common rotary body to be larger and therefore more stable. As a result, the tool can be made to be highly loadable.

In some embodiments, the common rotary body has a varying cross-section along its length. The varying cross-section defines the rotatable processing devices. A roller form of the common rotary body can allow the rotary body to be formed as a simple rotary part.

In certain embodiments, at least one counter-device is rotatable on the second tool portion. Thus, workpiece processing takes place with the rotatable processing device and the rotatable counter-device rolling along their respective sides of the workpiece. This can help to provide for relatively gentle workpiece processing.

In some embodiments, at least one rotatable counter-device is a universally rotatable ball. Alternatively or in addition, at least one rotatable processing device is a universally rotatable ball. The use of balls can also allow contours having especially small radii to be produced. In the case of rotary bodies which are rotatable about only one rotational axis, an orientation of the rotary body's rotational axis perpendicular to the longitudinal direction of a contour to be produced is generally necessary. When a universally rotatable ball is used, such orientation is superfluous.

In certain embodiments, the tool can also include an activating mechanism which is operable to displace the counter-device (e.g., of a device pairing including the counter-device and a processing device) toward an operating position. In the operating position, the counter-device projects towards the workpiece relative to other counter-devices. Alternatively or in addition, the rotatable processing device of the device pairing to be activated is transferable into a corresponding operating position. Disturbing influences of counter-devices and processing devices, respectively, not activated during workpiece processing may thus be avoided.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
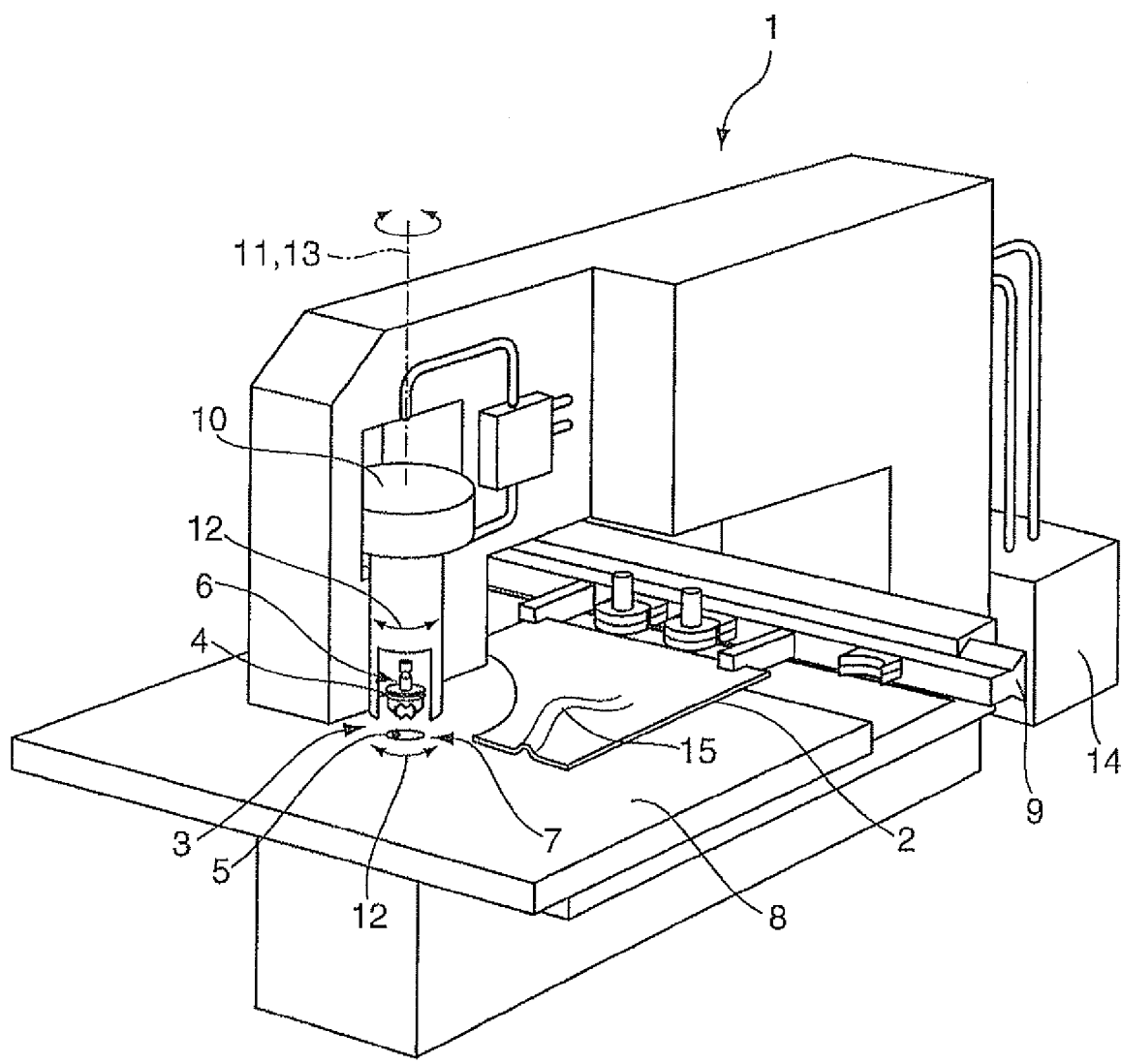
FIG. 1 is a perspective view of a machine tool for cutting and/or forming metal sheets.

According to FIG. 1, a machine tool 1 for cutting and/or forming metal sheets 2 has a tool 3 having a first tool portion in the form of an upper tool 4, and a second tool portion in the form of a lower tool 5. The upper tool 4 is held by an upper tool holder 6 and the lower tool 5 is held by a lower tool holder 7. The upper tool 4 and the lower tool 5 are arranged on opposite sides of the metal sheet 2 to be processed. A workpiece (e.g., the metal sheet 2) to be processed is supported on a workpiece table 8 and is moved relative to the tool 3 with a coordinate guide 9 during workpiece processing.

The upper tool 4 is movable along an application axis 11 relative to the lower tool 5 via a press drive 10. The tool holders 6 and 7 are each provided with a respective rotary tool drive 12. The upper tool 4 and the lower tool 5 can be rotated, via the tool drives 12, in a controlled manner about a rotational axis 13 of the tool which is identical with the application axis 11.

All of the drives of the machine tool 1 are controlled by a central numerical control unit 14.

At the commencement of workpiece processing, the metal sheet 2 is positioned between the upper tool 4 and the lower tool 5 by the coordinate guide 9. The upper tool 4 is then lowered along the application axis 11 by the press drive 10 until the metal sheet 2 is acted upon on its two sides by the upper tool 4 and the lower tool 5. The action on the metal sheet 2 by the upper tool 4 and the lower tool 5 therefore takes place along the application axis 11.

Starting from these conditions, the metal sheet 2 is moved relative to the tool 3 by the coordinate guide 9. Depending on the type of tool 3, the metal sheet 2 acted upon is formed or cut along a predetermined processing line. For example, a shaping produced on the metal sheet 2 using the tool 3 is shown in the form of a bead 15 in FIG. 1. The rotary drives 12 allow the tool portions to be oriented along the contour to be produced on the metal sheet 2.

After the completion of workpiece processing with the tool 3, the tool 3 is replaced by another processing tool arranged on the coordinate guide 9. Depending on the type of tool used in exchange, a processing of the metal sheet 2 again takes place in continuous operating mode, or an intermittent strokewise processing takes place. For example, the tool used in exchange may be a punching tool.

Figure 2:
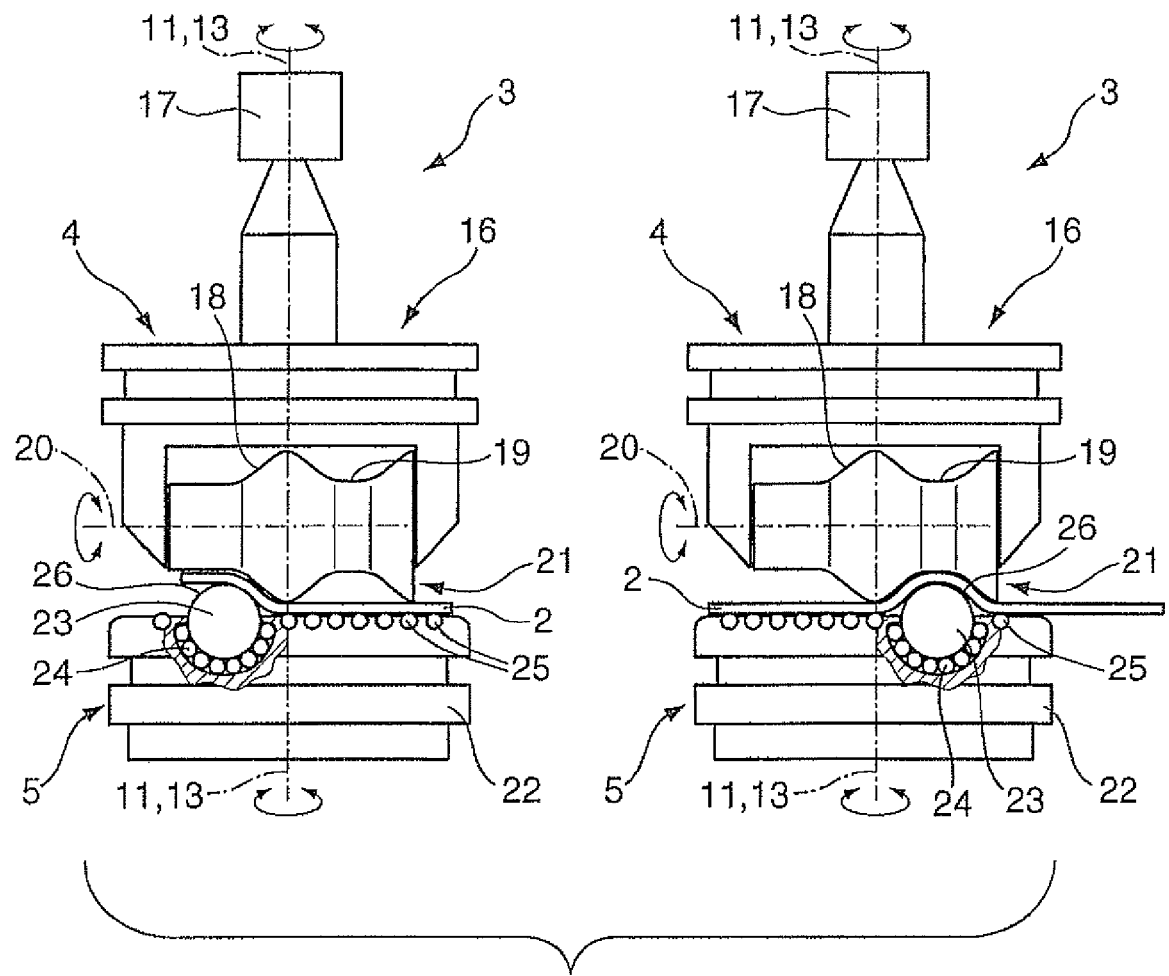
FIG. 2 shows a tool having a first construction for forming metal sheets.

Referring to FIG. 2, the upper tool 4 has a base body 16 having a shank 17 which is to be received in the upper tool holder 6. In addition, the upper tool 4 includes two different rotatable processing devices (i.e., first and second processing devices 18 and 19, respectively). The first processing device 18 is used to produce a step, and the second processing device 19 is used to produce a bead. The first and second processing devices 18 and 19 are rotatable on the upper tool 4 about a rotational axis 20. They lie next to each other perpendicularly to the application axis 11 on a common rotary body in the form of a roller 21. Furthermore, they follow each other about the rotational axis 13 of the tool.

The roller 21 is supported on the base body 16 of the upper tool 4 by pivot bearings. The roller 21 has cross-sections of different sizes along its rotational axis 20. The first and second processing devices 18 and 19 are formed on the roller 21 owing to the variation in cross-section.

The lower tool 5 has a base body 22 on which a counter-device 26 in the form of a universally rotatable ball 23 is supported. For the purpose of illustration, the bearing of the ball 23 is shown partly cut open. The bearing has a plurality of small ball bearings 24. On its upper side, the lower tool 5 forms a workpiece support for the metal sheet 2 to be processed. In order to reduce the friction between the metal sheet 2 to be processed and the lower tool 5, a plurality of rotatably supported supporting balls 25 are provided on the lower tool 5.

During workpiece processing, the rotatable counter-device 26 forms a device pairing with one of the first and second processing devices 18 and 19.

Under the conditions shown in the left-hand partial view of FIG. 2, the tool 3 is in a state in which a device pairing with the first processing device 18 and the counter-device 26 is activated for workpiece processing. The metal sheet 2 to be processed is acted upon by the first processing device 18 and the counter-device 26 along the application axis 11. Starting from the situation shown on the left-hand side of FIG. 2, the metal sheet 2 is moved by the coordinate guide 9 (FIG. 1) relative to the tool 3 in a direction which extends perpendicularly to the plane of the drawing of FIG. 2. With the first processing device 18 and the counter-device 26 aligned therewith and rolling along their respective sides of the workpiece, a step is produced on the metal sheet 2 in continuous operating mode.

With reference to the right-hand partial view of FIG. 2, the tool 3 is in a state in which a device pairing with the second processing device 19 and the counter-device 26 is activated for workpiece processing. In that case, a shaping in the form of a bead is produced on the metal sheet 2 by a relative movement of the metal sheet 2 and the tool 3 in a direction extending perpendicularly to the plane of the drawing of FIG. 2, with the processing device 19 and the counter-device 26 aligned therewith and rolling along their respective side of the workpiece.

In order to produce curved contours the upper tool 4 and the lower tool 5 are rotated synchronously about the rotational axis 13 of the tool by the rotary drives 12 (FIG. 1) arranged at the machine side, so that the rotational axis 20 of the roller 21 extends at all times perpendicularly to the longitudinal direction of the contour to be produced.

In order to switch between the conditions on the left-hand side of FIG. 2 and the conditions on the right-hand side of FIG. 2, the lower tool 5 can be rotated by its rotary drive 12 through an angle of 180° relative to the upper tool 4 about the rotational axis 13 of the tool. The upper tool 4 may possibly have to be raised beforehand and lowered again after the rotation of the lower tool 5.

By the described relative rotational movement, two different device pairings each with a respective one of the first and second processing devices 18 and 19 can be activated for workpiece processing.

The relative rotational movement takes place by rotating the lower tool 5 while the upper tool 4 remains at a standstill. Alternatively, the activating relative rotational movement may consist solely in a rotational movement of the upper tool 4 or in combined rotational movements of the upper tool 4 and the lower tool 5.

Figure 3:
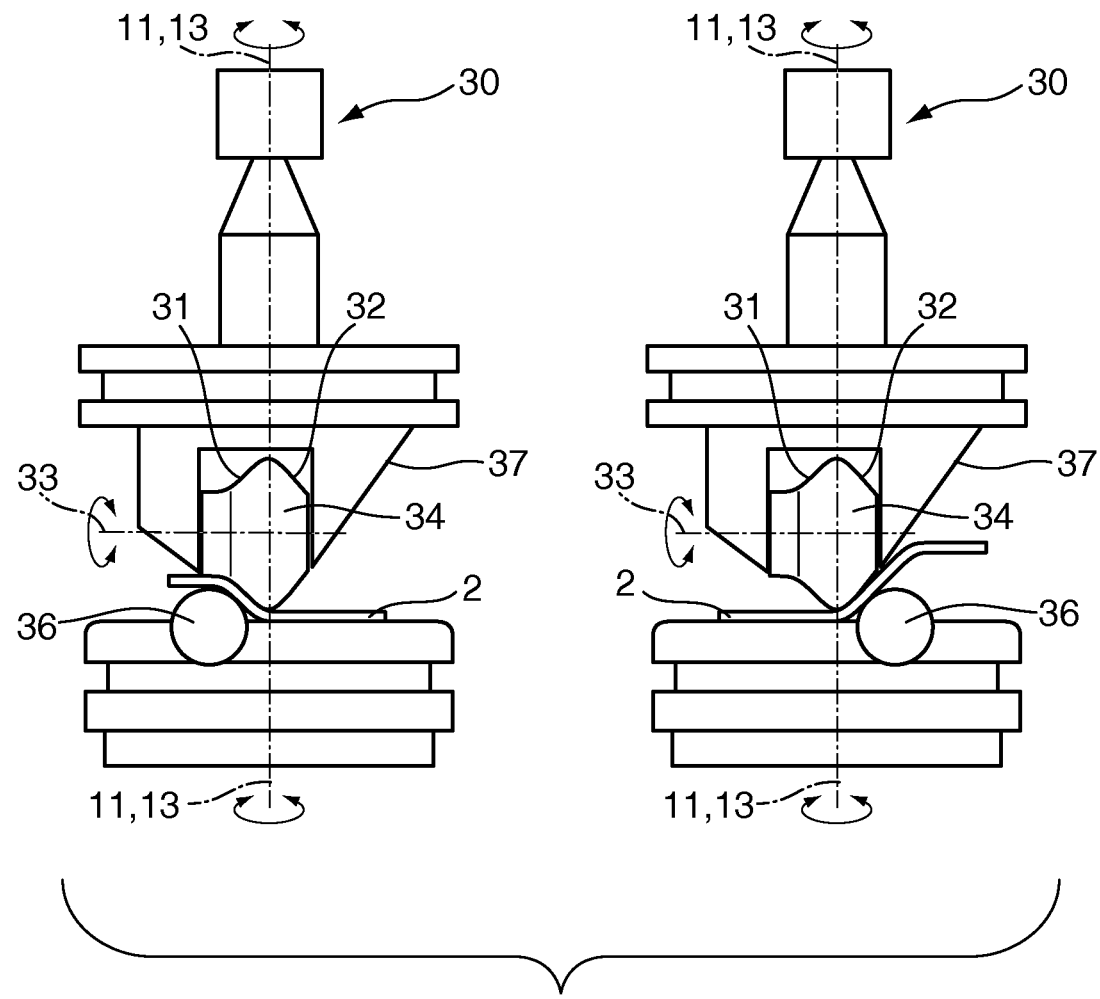
FIG. 3 shows a tool having a second construction for forming metal sheets.

Referring to FIG. 3, a tool 30 having a second construction is used to form metal sheets 2. The tool 30 has two rotatable processing devices (i.e., first and second processing devices 31 and 32, respectively) which are rotatable about a rotational axis and which are provided on a common rotary body or common roller 34. A rotatable counter-device is provided in the form of a universally rotatable ball 36.

In the case of the tool 30, steps are produced on the metal sheet 2 to be processed, using both activatable device pairings. When the first processing device 31 is used, only relatively low steps can be formed. Owing to a recess 37 at the base body side, relatively high steps can be produced by the second processing device 32.

Figure 4:
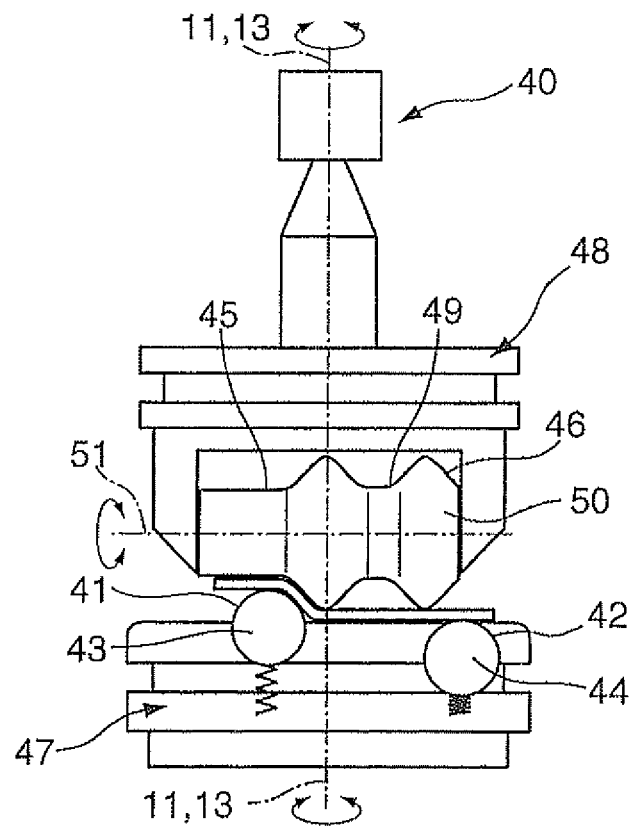
FIG. 4 shows a tool having a third construction for forming metal sheets.

A tool 40 having a third construction for forming metal sheets 2 is shown in FIG. 4. Unlike the tools 3 and 30 described above, the tool 40 has two rotatable counter-devices (i.e., first and second counter-devices 41 and 42, respectively), which are provided in the form of rotatable balls 43 and 44, respectively. One of the first and second counter-devices 41 and 42 can be transferred into an operating position by an activating mechanism. The activating mechanism can be, for example, a rotatable annular base that is connected to the lower tool 5 and which is configured to move one of the first and second counter-devices 41 and 42 into an operating position when the activating mechanism is rotated to a first position, and which is configured to move the other of the first and second counter devices 41 and 42 into an operating position when the activating mechanism is rotated to a second position. The counter-devices project toward the upper tool 4 to a greater extent when in the operating position than when in a non-operating position. Additional details of the activating mechanism and other details and features combinable with those described herein may be found in U.S. patent application Ser. No. 12/424,802, filed Apr. 16, 2009, entitled "PLATE WORKPIECE PROCESSING TOOLS AND MACHINES," the entire contents of which application are hereby incorporated by reference. According to FIG. 4, the first counter-device 41 is in its operating position in which it projects towards the metal sheet 2 relative to the second counter-device 42.

The first counter-device 41 and a first processing device 45 form an activated device pairing for workpiece processing. The second counter-device 42 is in a non-operating position in FIG. 4.

If, via the activating mechanism, the second counter-device 42 is transferred into its operating position and at the same time the first counter-device 41 is transferred into its non-operating position, the device pairing with the second counter-device 42 and a second processing device 46 is activated for workpiece processing.

As an alternative to the two device pairings described, a third device pairing can also be activated for workpiece processing. For this purpose, starting from the conditions shown in FIG. 4, the lower tool 47 is rotated through an angle of 180° relative to the upper tool 48 about the rotational axis 13 of the tool. Alternatively, only the upper tool 48 can be rotated or both tool portions can be rotated in a combined manner. In any case, a device pairing comprising the first counter-device 41 and a third processing device 49 is activated.

All of the rotatable processing devices (i.e., first, second, and third processing devices 45, 46 and 49, respectively) of the tool 40 are provided on a common rotary body or common roller 50 which is rotatable on the upper tool 48 about a rotational axis 51 extending perpendicularly to the application axis 11.

Figure 5:
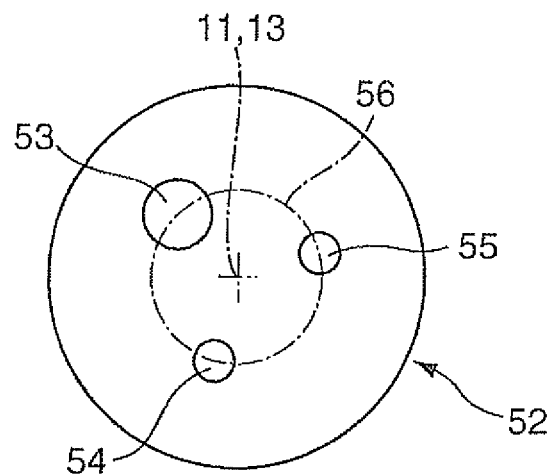
FIG. 5 is a plan view of a lower tool portion of a tool having a fourth construction for forming metal sheets and FIG. 6 shows a tool having a fifth construction for forming metal sheets.

According to FIG. 5, a lower tool 52, shown in diagrammatic plan view, of a tool having a fourth construction has rotatable counter-devices in the form of three universally rotatable balls 53, 54 and 55 which are arranged on a circular path 56 around the rotational axis 13 of the tool. Like the tool 40 according to FIG. 4, the balls 53, 54 and 55 can each be transferred into an operating position by a respective activating mechanism. The ball 53 has a larger diameter than the balls 54 and 55. Provided on the associated upper tool are rotatable processing devices which each form activatable device pairings with a respective one of the rotatable counter-devices on the lower tool 52 for workpiece processing.

Figure 6:
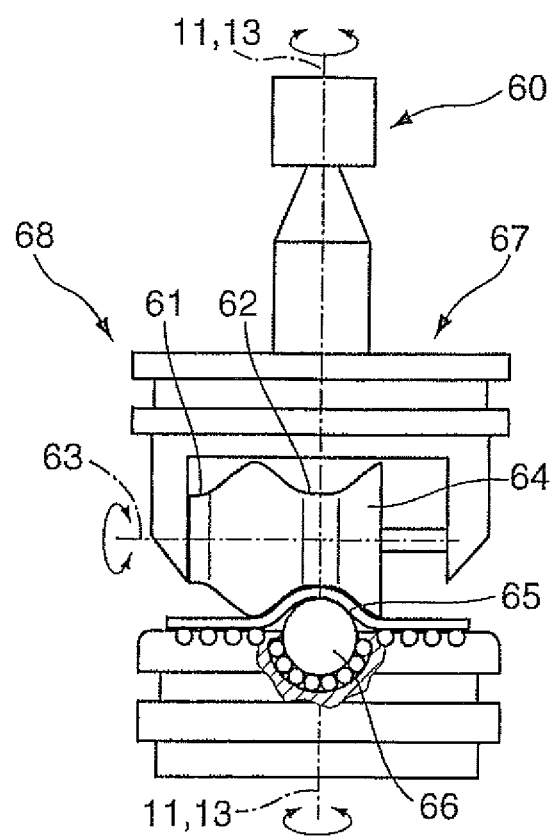

FIG. 6 illustrates a tool 60 having a fifth construction which offers a further possibility for activating different device pairings with different rotatable processing devices for workpiece processing.

The tool 60 has two rotatable processing devices (i.e., first and second processing devices 61 and 62, respectively) on a rotary body in the form of a roller 64 which is rotatable about a rotational axis 63. A counter-device 65 is provided in the form of a universally rotatable ball 66. The roller 64 is displaceable together with the first and second processing devices 61 and 62 on the base body 67 of the upper tool 68 in the direction of the rotational axis 63.

According to FIG. 6, a device pairing with the second processing device 62 and the counter-device 65 is in a state activated for workpiece processing. In order, starting from this state, to activate a device pairing with the first processing device 61 and the counter-device 65 for workpiece processing, the first and second processing devices 61 and 62 are displaced relative to the counter-device 65 in the direction of the rotational axis 63.

The relative movement of the first and second processing devices 61 and 62, on the one hand, and of the counter-device 65, on the other hand, is effected by displacing the roller 64 in the direction of the rotational axis 63 on the base body 67 of the upper tool 68. During this process, the roller 64 is displaced until the processing device 61 is aligned with and arranged above the counter-device 65.

The upper tool 68 may possibly have to be raised from the metal sheet 2 before the roller 64 can be displaced. After the displacement of the roller 64, the upper tool 68 is lowered onto the metal sheet 2 again for workpiece processing.

The device pairing activated for workpiece processing is arranged substantially centrally on the tool 60. Thus, transverse forces and moment loads which may occur in the case of off-centre workpiece processing may be avoided or at least reduced.

Constructions of tools for sheet-metal processing which differ from the above constructions are possible. For example, it is also possible to provide cutting edges as rotatable processing devices and counter-devices.

A number of embodiments of the invention have been described. Nevertheless, it will be understood that various modifications may be made without departing from the spirit and scope of the invention.

What is claimed is:

1. A method of processing a plate workpiece, the method comprising:
   placing a metal sheet between a first tool portion that carries a roller comprising first and second processing devices and a second tool portion that carries one or more counter-devices;
   aligning one of the first and second processing devices with one of the one or more counter-devices to form a first device pairing;
   utilizing the first device pairing to perform a first machining operation on the metal sheet;
   after the first machining operation is completed, aligning the other one of the first and second processing devices with one of the one or more counter-devices to form a second device pairing, different from the first device pairing; and
   utilizing the second device pairing to perform a second machining operation, different from the first machining operation, on the metal sheet.

2. The method of claim 1, wherein the first and second processing devices are separately alignable with a common one of the one or more counter devices to form different device pairings.

3. The method of claim 1, wherein the first and second processing devices are rotatable, relative to the first tool portion, about a first rotational axis.

4. The method of claim 1, wherein the first and second processing devices are aligned with the one or more counter-devices by rotating the first and second processing devices and the one or more counter devices relative to each other about a second rotational axis.

5. The method of claim 4, wherein the first and second processing devices and the one or more counter devices are rotated relative to each other about the second rotational axis by rotating the first tool portion and the second tool portion relative to each other about the second rotational axis.

6. The method of claim 4, wherein the second rotational axis is an application axis.

7. The method of claim 4, wherein the second rotational axis extends parallel to an application axis.

8. The method of claim 4, wherein the first and second processing devices are arranged to follow each other about the second rotational axis.

9. The method of claim 4, wherein the first and second processing devices are rotatable, relative to the first tool portion, about a first rotational axis, the first rotational axis extending perpendicular to the second rotational axis.

10. The method of claim 3, wherein the first and second processing devices are arranged to follow each other along the first rotational axis.

11. The method of claim 1, wherein the roller comprises a common rotary body that defines the first and second processing devices.

12. The method of claim 11, wherein the common rotary body is rotatable, relative to the first tool portion, about a first rotational axis, the first and second processing devices thus being rotatable, relative to the first tool portion, about the first rotational axis.

13. The method of claim 11, wherein the common rotary body has a varying cross-section along its length, and wherein the varying cross-section defines the first and second processing devices.

14. The method of claim 1, further comprising rotating at least one of the one or more counter-devices relative to the second tool portion.

15. The method of claim 1, wherein at least one of the one or more counter-devices is a universally rotatable ball.

16. The method of claim 1, further comprising displacing at least one of the one or more counter-devices relative to at least one other of the one or more counter-devices into an operating position projecting toward the first tool portion.

17. The method of claim 1, wherein the first and second processing devices are aligned with the one or more counter-devices by displacing the first and second processing devices linearly relative to the first tool portion along a displacement axis.

18. The method of claim 17, wherein the displacement axis coincides with a first rotational axis, about which the first and second processing devices are rotatable relative to the first tool portion.

19. The method of claim 18,
wherein the first and second processing devices are defined by a common rotary body of the roller;
wherein the common rotary body of the roller is rotatable about the first rotational axis, the first and second processing devices thus being rotatable, relative to the first tool portion, about the first rotational axis; and
wherein the first and second processing devices are arranged to follow each other along the displacement axis coinciding with the first rotational axis.

20. The method of claim 1, wherein the roller is arranged along a second rotational axis defining an application axis of the first tool holder, wherein the roller is rotatable about the second rotational axis and rotatable about a first rotational axis that is perpendicular to the second rotational axis, and wherein the first and second processing devices are arranged along the first rotational axis such that the first and second processing devices are configured to follow each other about the second rotational axis.

21. The method of claim 1, wherein the first and second processing devices and the one or more counter-devices are formed such that either of the first and second processing devices can act with any one of the one or more counter-devices for performing the first and second machining operations on the metal sheet disposed between the first and second tool portions.

* * * * *